(12) United States Patent
Fuente

(10) Patent No.: US 6,345,331 B1
(45) Date of Patent: Feb. 5, 2002

(54) DEVICE ADAPTER BEING REINTEGRATED WITH PLURALITY OF DEVICE ADAPTERS OF NETWORK, OR REESTABLISHING PERMISSIONS AND RESUBMITTING I/O REQUESTS DEPENDING ON DETERMINED DEVICE STATE AFTER FAILURE

(75) Inventor: Carlos Francisco Fuente, Portsmouth (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/295,736

(22) Filed: Apr. 20, 1999

(51) Int. Cl.⁷ .......................... G06F 11/00; G06F 11/30; G06F 3/00; G06F 13/00; G06F 13/12

(52) U.S. Cl. .............................. 710/72; 710/15; 710/16; 710/19; 710/62; 710/64; 714/2; 714/8; 714/9; 714/15; 714/16; 714/17; 714/18; 714/21; 714/23

(58) Field of Search ............................ 710/2, 8, 10, 15, 710/16, 17, 19, 62, 64, 72; 714/2, 8, 9, 15, 16, 17, 18, 21, 23

(56) References Cited

U.S. PATENT DOCUMENTS

| 5,438,675 | A | * | 8/1995 | Fujioka | 714/9 |
|---|---|---|---|---|---|
| 5,815,647 | A | * | 9/1998 | Buckland et al. | 714/3 |
| 5,931,954 | A | * | 9/1999 | Hoshina et al. | 714/5 |
| 6,044,475 | A | * | 3/2000 | Chung et al. | 714/15 |
| 6,145,095 | A | * | 11/2000 | Tattari | 714/16 |
| 6,161,198 | A | * | 12/2000 | Hill et al. | 714/15 |
| 6,175,932 | B1 | * | 1/2001 | Foote et al. | 714/9 |

* cited by examiner

Primary Examiner—Thomas Lee
Assistant Examiner—Tanh Q. Nguyen
(74) Attorney, Agent, or Firm—Noreen A. Krall

(57) ABSTRACT

Disclosed is a device adapter for controlling devices in a network comprising computer processor nodes and one or more devices, the device adapter having means for determining whether or not a device state has changed after a failure. Responsive to a determination that the device state has not changed, the adapter communicates with other device adapters in the network to reestablish permissions before resubmitting I/O requests. Responsive to a determination that the device state has changed after a failure, the adapter reintegrates itself with the other device adapters in the network before reprocessing work as necessary.

9 Claims, 2 Drawing Sheets

DEVICE ADAPTER BEING REINTEGRATED WITH PLURALITY OF DEVICE ADAPTERS OF NETWORK, OR REESTABLISHING PERMISSIONS AND RESUBMITTING I/O REQUESTS DEPENDING ON DETERMINED DEVICE STATE AFTER FAILURE

FIELD OF THE INVENTION

This invention relates to the field of device control in computer systems, and more particularly to the control of devices shared by computer processor nodes in a network.

BACKGROUND OF THE INVENTION

In computer systems, device adapters are used to control communication between the computer processor and the various peripheral devices. In the past, device adapters were typically dedicated to the control of a single device by a single computer. In more modern systems, device adapters often form part of a network structure having multiple devices and multiple computers. In the field of device control, while it is desirable to improve the processing capacity and speed of the system, it is often more important to improve the failure-tolerance of the system. This is especially important in the control of shared resources in the modern network of computers, device adapters and devices, which presents a complex set of problems relating to integrity, robustness and recoverability over failures within the system. In solving any of these problems, cost constraints also inevitably play a part in determining the best solution.

Modern computer systems provide for the ability for multiple compute nodes to share access to resources, such as disks or disk controllers. Sometimes, the goal is simply to provide for increased computing capacity, but frequently, the system is also required to be tolerant of a failure of one of the compute nodes. The goal is to provide a system with greater reliability than a system with a single compute node, by removing a single point of failure.

Almost always, to provide meaningful service, a compute node must be capable of updating the shared resource, such as by issuing a write to a disk or disk controller. In order to maintain integrity of the data stored on the shared resource, the compute nodes sharing access must communicate by some means, to ensure they are each aware of the updates that are being performed. The protocols are varied, but can include:

1. Protocols where the resource is understood to be 'owned' by a single node, which is the only node that can perform updates. The other nodes do not access the resource, except in the event that they detect a failure of the 'owning' node.
2. Protocols where the compute nodes maintain a fine degree of locking control: they negotiate on every update (write) access for exclusive access to a small region of the resource affected to be updated.

Whatever the protocol, there is a fundamental problem when handling a failure of a node, or when a new node appears. When a node fails, the other compute nodes might become aware of the failure when an attempt to communicate with that node fails. At that point, the working nodes wish to continue operation of the shared resource, in the absence of the failed node. This is sometimes known as failover. But the other nodes must be able to ensure that the failed node can no longer access the shared resource, perhaps in the belief that it is the working node, and the other nodes have failed. This problem is particularly difficult, considering that compute nodes typically have multiple paths to a resource (again to provide for greater availability), and that the paths usually contain buffering, to reduce the latency of communications, which mean that access commands can be held at many points between a compute node and the shared resource.

International patent application PCT/US96/17603 further discusses the problems involved here.

An equivalent problem also arises when a previously failed node re-enters the configuration, newly acquiring access to the resource. Here, the arriving compute node must be made to be aware of the fact that it had lost access to the resource, to ensure that it is aware of the loss of access, and that it might need to re-communicate with the working nodes, to ensure that its intended updates are still valid.

The previously mentioned international patent application discloses a scheme which requires the managing compute nodes to maintain knowledge of the set of nodes that have access to a resource at any point in time. The knowledge is used to generate a 'key' which is used to tag every command that is sent to the disk controller (or other shared resource). The device controller is also aware of the current key, and rejects commands which contain out-of-date keys.

This scheme solves the problem, but introduces a requirement for a new command set, which makes it excessively costly in systems in which it would be preferable to use widely-available, industry-standard components, such as SCSI disks.

SUMMARY OF THE INVENTION

In order to address the limitations of the prior art described above, the present invention provides a device adapter for controlling devices in a network comprising computer processor nodes and one or more devices, the device adapter having means for determining whether or not a device state has changed after a failure. Accordingly, in a first aspect, the present invention provides a device adapter in a network having a plurality of device adapters, comprising: means for determining if a device state is changed or unchanged after a failure; means, responsive to a determination that said device state is unchanged, for reestablishing permissions; means, further responsive to a determination that said device state is unchanged, for resubmitting I/O requests; and means, responsive to a determination that said device state is changed, for reintegrating said device adapter with said plurality of device controllers. A preferred feature of the device adapter of the first aspect of the present invention is that said device adapter is operable to control a device using Serial Storage Architecture (SSA) protocols. A further preferred feature of the first aspect is that said device adapter is operable to control a device using Fiber Channel Arbitrated Loop (FC-AL) protocols. A further preferred feature of the first aspect is that said device adapter is operable to control a device using Small Computer Systems Interface (SCSI) disk control means.

In a second aspect, the present invention provides a computer system having one or more devices accessible via a network by one or more computer processing nodes, comprising device adapters of the first aspect.

In a third aspect, the present invention provides a method of controlling one or more devices by a plurality of device adapters in a computer system having a plurality of computer processing nodes, wherein said devices are accessible by said computer processing nodes via a network, said method comprising the steps of: determining if a device state is changed or unchanged after a failure; and responsive to a determination that said device state is unchanged, carrying out the steps of: reestablishing permissions; and re-submitting I/O requests; or responsive to a determination that said device state is changed, reintegrating a device adapter into said plurality of device adapters.

In a fourth aspect, the present invention provides a computer program product, stored on a computer-readable storage medium, for executing computer program instructions to carry out the steps of a method of the third aspect.

BRIEF DESCRIPTION OF THE DRAWINGS

Preferred embodiments of the present invention will now be described by way of example, with reference to the drawings in which.

DESCRIPTION OF THE PREFERRED EMBODIMENTS

The invention may be implemented using any combination of computer programming software, firmware or hardware. As a preparatory step to practicing the invention or constructing an apparatus according to the invention, the computer programming code (whether software or firmware) according to the invention will typically be stored in one or more machine readable storage devices such as fixed (hard) drives, diskettes, optical disks, magnetic tape, semiconductor memories such as ROMs, PROMs, etc., thereby making an article of manufacture according to the invention. The article of manufacture containing the computer programming code is used by either executing the code directly from the storage device, by copying the code from the storage device into another storage device such as a hard disk, RAM, etc. or by transmitting the code on a network for remote execution. The method form of the invention may be practiced by combining one or more machine readable storage devices containing the code according to the invention with appropriate standard computer hardware to execute the code contained therein. An apparatus for practicing the invention could be one or more computers and storage systems containing or having network access to computer programming code according to the invention.

Figure 1:
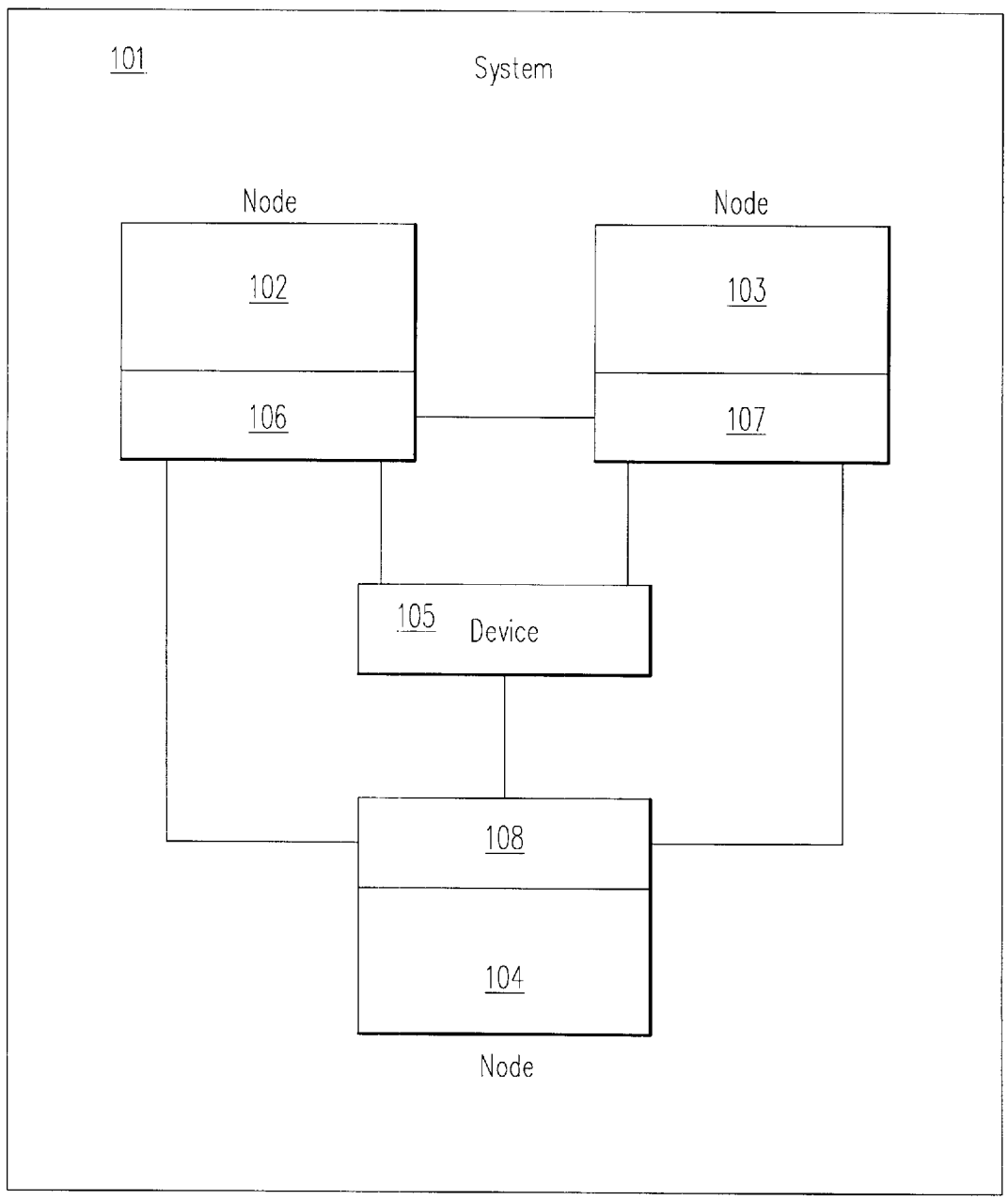
FIG. 1 shows a computer system having device adapters according to the present invention.

In FIG. 1 there is shown a computer system (101) comprising compute nodes (102, 103, 104) connected to one another and to a device (105) via a network. Each compute node comprises a processor and memory, which lie outside the scope of the invention, and a device adapter (106, 107, 108) for controlling the communications with the device and with the other device adapters in the network.

The preferred embodiments of the present invention are operable in a number of device control environments, for example, in environments using the Serial Storage Architecture (SSA), in environments using Fiber Channel Arbitrated Loop (FC-AL) protocols, and also in environments using the Small Computer System Interface (SCSI) means to control the device.

These protocols, as part of their low-level network management, provide mechanisms which require nodes to exchange information, in order to establish any communication.

In a first preferred embodiment, the network of device adapters uses the Serial Storage Architecture (SSA) protocols for communication and device control.

In SSA, any network change which might cause a change in the access between compute nodes and shared resources such as disks or disk controllers, causes the links at the point of the change to enter 'privileged mode'. At the same time, a message is sent to a node called the 'master', alerting it of the error. The master is then responsible for coordinating recovery, and making all other initiators and target nodes aware of the change, as far as it affects them. As part of the recovery process, the master 'quiesces' the I/O for any node that has disappeared. This both cancels any ongoing work, and removes the registration (established by Query_Node) which enables the absent nodes to begin new communications. These protocols already satisfy the requirements that all compute nodes be made aware of the change, and that all communications before the change are invalidated.

In a second preferred embodiment, the network of device adapters uses the Fiber Channel Arbitrated Loop (FC-AL) protocols for communication and device control.

In FC-AL, the situation is perhaps simpler. In order to participate in an FC-AL loop, a node must be allocated an address, known as an AL_PA. These are allocated during the Loop Initialization Procedure (LIP). The LIP process requires that a number of frames be circulated around the loop, which establish the contents of the loop, and inform each of the present nodes of those contents. Following the LIP, the initiator and target nodes exchange information to re-establish communication. The initiator nodes can choose to resume I/Os, by using a process called 'port discovery' to reestablish communications. Alternatively, initiators can start I/Os afresh, by using a process known as 're-login', which requires all I/O requests to be resubmitted. The preferred embodiment assumes that the latter technique is always used. If a node disappears, a LIP is forced, which deallocates that AL_PA from that node. If that node reappears, it must request a new LIP to obtain a new AL_PA. Having done this, it will use the re-login process to re-establish access to the devices. This again satisfies the requirements of ensuring knowledge of the change amongst the compute nodes, and ensuring all old communications are invalidated.

In both of these preferred embodiments, it is necessary that a proper procedure be followed after communications are resumed, after the notification of the network change described above. In both SSA and FC-AL, the initiator nodes are made aware of the disruption to their I/O, and the need to attempt a retry. A conventional algorithm would have the initiators resubmit all I/O requests immediately the network disruption is resolved. The conventional algorithm would need to take care to ensure that the proper, new, hardware address is used; both SSA and FC-AL might assign different hardware addresses to nodes after a network disruption. This problem is known, and is handled by conventional means.

However, such a conventional algorithm does not address the problem described above: that is, if communications have been disrupted, it is possible that the shared resource has been operated by a different set of initiators, and is no longer in the same state as it was before the disruption, and the resubmission of the I/O requests would cause the state of the shared resource to be made invalid.

Thus, every network disruption must be treated as a potential change in the management group. The I/O requests affected by the disruption are failed by the network configuration protocols appropriate for the network. Before resubmitting the I/O requests, each initiator inspects the shared resource, to determine its current state. If the state is as it was before the network disruption, then the initiators present must communicate to reestablish any permissions that existed before the disruption, to allow the resubmission.

Once the permissions have been properly reestablished, the I/O requests can be resubmitted.

If, alternatively, when the state is inspected, the device is found to be in a different state than that expected, then the initiator is aware that the disruption caused it to be removed from the management group, and it must not retry its I/O requests. Instead, that initiator must communicate with the other initiators, and attempt to reintegrate itself with the current set of managing initiators.

This additional step, of reinspecting the device, is unknown in the art, and enables the problem to be solved without requiring any other mechanisms to be in place. Hence, this invention can be implemented on any SSA or FC-AL subsystem.

The invention does require that state information be maintained on the disk, and that each initiator is aware of how that state information is encoded, and is to be inspected. The state information must minimally be updated every time the set of managing nodes changes, it can optionally be changed at other times, if that is needed for other reasons outside of this invention.

In the preferred embodiments of the invention, the state information is written to special sectors of the disk, which are reserved specifically for maintaining this and other information needed for the management of the disk. The information includes a list of managing initiators (identified by SSA Unique ID, or FC-AL World Wide Name), as well as a 'version number' which only increases during the lifetime of the drive. (A 32 bit number is sufficient to enumerate all updates to a disk drive's state information for the lifetime of any conventional drive).

Other schemes are possible, but must be sufficiently strong to uniquely identify the resource's state at any point in time, so that initiators can distinguish a changed from an unchanged state. The state here includes the list of initiators that are managing that device.

Figure 2:
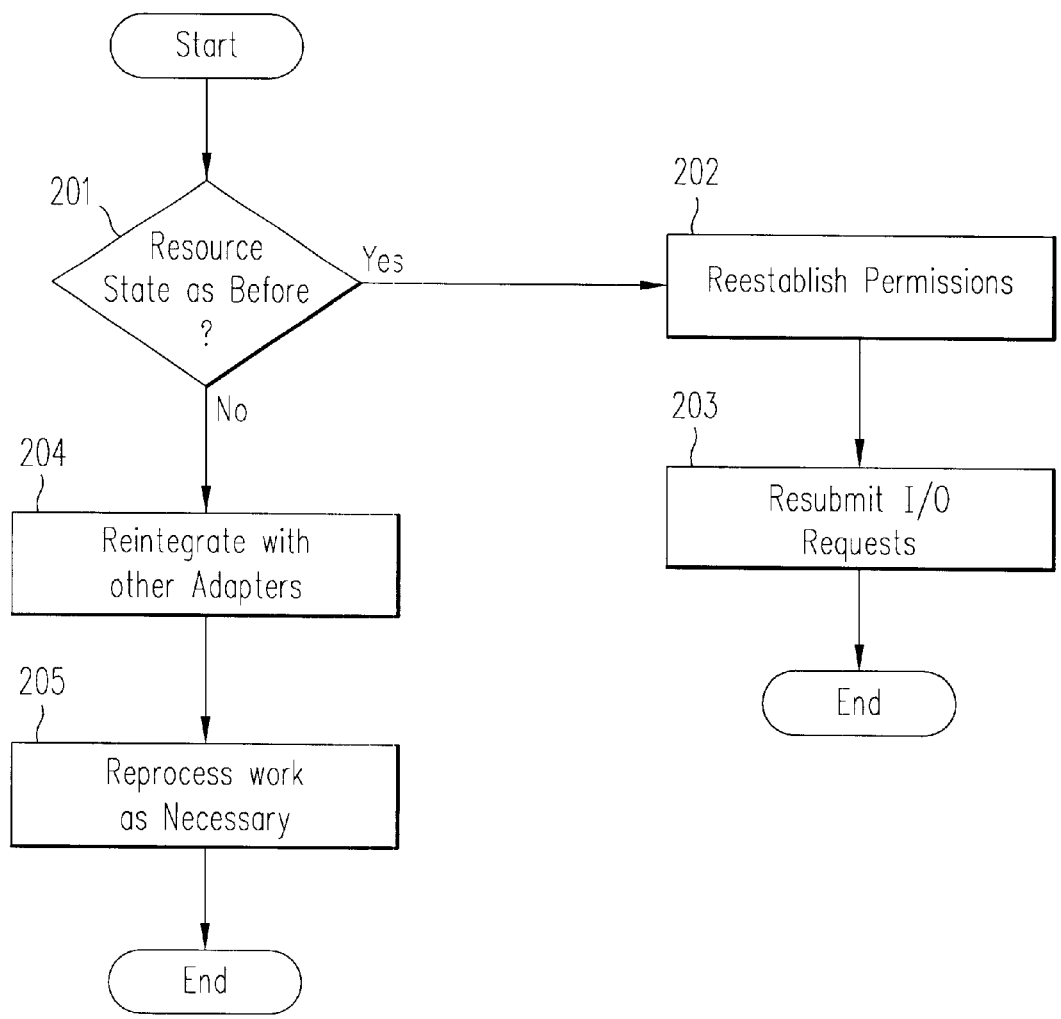
FIG. 2 is a flow chart showing a sequence of processing according to the present invention.

Referring now to FIG. 2, a procedure is shown by which the preferred embodiments of the invention operate in response to a failure of a compute node in the system.

The procedure begins when conventional means reestablish the network after a disruption. Each device adapter tests (201) whether the resource state is as it was before the disruption. If the resource state is as it was before the disruption, the device adapters communicate to reestablish the permissions (202) before resubmitting I/O requests (203).

If the resource state is not as it was before the disruption, each device adapter must reintegrate itself (204) with the other device adapters in the system, before reprocessing work (205) as necessary.

Thus far, the preferred embodiments using SSA and FC-AL protocols have been described. However, the present invention has a further preferred embodiment in systems using the SCSI means to control devices.

The invention can be extended to be used on SCSI devices, where there is no network protocol comparable to the protocols used for the serial interfaces used by SSA and FC-AL. The SCSI Unit Attention mechanism can be used to provide the same level of notification and invalidation of old commands. Whenever an update to the state information is made, which involves a change in the managing list of adapters, a Unit Attention must also be placed on the drive, as an atomic operation, to notify all the other initiators of the change. When an initiator receives a Unit Attention, it must emulate the behaviour of the network management protocols above. That is, it must abort all commands queued on the drive, and then begin the process of redetermining the state of the drive, before retrying any I/O requests.

The update of the state, and the placing of unit attention, must be done as one atomic operation. This can be done by a number of known methods. One method uses the SCSI 'Link' flag to ensure an indivisible sequence of I/O requests is executed. This mechanism breaks down however, if an error condition (even a recoverable one), exists on the drive. In this case, the Link is broken, and the operation is not atomic.

An alternative mechanism is to use a temporary SCSI Reservation during the set of commands to update the state and place the Unit Attention. This is somewhat more difficult to achieve, in that the SCSI Reservation can be disrupted by a SCSI Bus Reset. In this case, the entire sequence of state update and unit attention must be repeated until it is achieved atomically, before it can be relied upon. This mechanism is tolerant of other errors, and is generally more acceptable than the Link method.

While the preferred embodiments have been described here in detail, it will be clear to those skilled in the art that many variants are possible without departing from the spirit and scope of the present invention. In particular, the preferred embodiments have been described in terms of disk storage devices, whereas the present invention may also be advantageously applied to systems comprising other types of devices. Equally, the invention should not be seen as limited to the particular architectures and protocols (SSA, FC-AL and SCSI) described in the preferred embodiments, as those skilled in the art will readily see that the invention may advantageously be applied in systems having other architectures for device control and communication.

Accordingly, it is to be understood that the invention disclosed herein is not to be limited by the illustrated embodiment, but only by the scope of the appended claims.

What is claimed is:

1. A device adapter, in a network comprising a plurality of device adapters and one or more devices, comprising:

means for determining if a device state is changed or unchanged after a failure;

means, responsive to a determination that said device state is unchanged, for reestablishing permissions;

means, further responsive to a determination that said device state is unchanged, for resubmitting I/O requests; and means, responsive to a determination that said device state is changed, for reintegrating said device adapter with said plurality of device adapters.

2. The device adapter as claimed in claim 1, further comprising means for storing said device state.

3. The device adapter as claimed in claim 2, wherein said one or more devices comprise storage devices and said means for storing said device state is operable to store said device state on said storage devices.

4. The device adapter as claimed in claim 1, wherein said device adapter is operable to communicate using Serial Storage Architecture (SSA) protocols.

5. The device adapter as claimed in claim 1, wherein said device adapter is operable to communicate using Fiber Channel Arbitrated Loop (FC-AL) protocols.

6. The device adapter as claimed in claim 1, wherein said device adapter is operable to control a device using Small Computer Systems Interface (SCSI) disk control means.

7. A computer system, having one or more devices accessible via a network by one or more computer processing nodes, said computer system including device adapters, each device adapter further comprising:

means for determining if a device state is changed or unchanged after a failure;

means, responsive to a determination that said device state is unchanged, for reestablishing permissions;

means, further responsive to a determination that said device state is unchanged, for resubmitting I/O requests; and means, responsive to a determination that said device state is changed, for reintegrating said device adapter with said plurality of device adapters.

8. A method of controlling one or more devices by a plurality of device adapters in a computer system comprising a plurality of computer processing nodes, wherein said devices are accessible by said computer processing nodes via a network, said method comprising the steps of:

determining if a device state is changed or unchanged after a failure; and responsive to a determination that said device state is unchanged, carrying out the steps of:
    reestablishing permissions; and
    re-submitting I/O requests; or responsive to a determination that said device state is changed, reintegrating a device adapter into said plurality of device adapters.

9. A computer program product comprising a computer readable medium having tangibly embodied thereon computer program code means for controlling one or more devices by a plurality of device adapters in a computer system comprising a plurality of computer processing nodes, wherein said devices are accessible by said computer processing nodes via a network, the computer program code means including:

computer programming code means, executable on the computer processing nodes for determining if a device state is changed or unchanged after a failure; and computer programming code means, executable on the computer processing nodes for responding to a determination that said device state is unchanged, carrying out the steps of:

computer programming code means, executable on the computer processing nodes for reestablishing permissions; and computer programming code means, executable on the computer processing nodes for re-submitting I/O requests; or computer programming code means, executable on the computer processing nodes for responding to a determination that said device state is changed, reintegrating a device adapter into said plurality of device adapters.

* * * * *